US010212075B1

(12) United States Patent
Lakshmikanthan et al.

(10) Patent No.: US 10,212,075 B1
(45) Date of Patent: Feb. 19, 2019

(54) CONVERGENCE OPTIMIZATION OF LOCAL SWITCHING FOR FLEXIBLE CROSS-CONNECT IN ETHERNET VIRTUAL PRIVATE NETWORK (EVPN) ENVIRONMENTS

(71) Applicant: Cisco Technology, Inc., San Jose, CA (US)

(72) Inventors: Ramanathan Lakshmikanthan, Santa Clara, CA (US); Ali Sajassi, San Ramon, CA (US); Patrice Brissette, Gatineau (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/712,305

(22) Filed: Sep. 22, 2017

(51) Int. Cl.
*H04L 12/46* (2006.01)
*H04L 12/723* (2013.01)
(Continued)

(52) U.S. Cl.
CPC .......... *H04L 45/50* (2013.01); *H04L 12/1868* (2013.01); *H04L 12/4679* (2013.01); *H04L 41/0668* (2013.01); *H04L 43/0811* (2013.01); *H04L 45/16* (2013.01); *H04L 45/22* (2013.01); *H04L 45/66* (2013.01)

(58) Field of Classification Search
CPC . H04L 45/50; H04L 41/0668; H04L 43/0811; H04L 12/1868; H04L 12/4679; H04L 45/66; H04L 45/22; H04L 45/16; H04L 45/52; H04L 45/507; H04L 47/00; H04L 1/00; H04L 49/00; H04L 49/10
See application file for complete search history.

(56) References Cited

U.S. PATENT DOCUMENTS 8,625,412 B2 * 1/2014 Voit ...................... H04L 12/462
370/221
9,001,644 B2 * 4/2015 Salam ................. H04L 41/0677
370/222

(Continued)

OTHER PUBLICATIONS

Sajassi et al., "BGP MPLS-Based Ethernet VPN", Request for Comments 7432, Feb. 2015, 56 pages, The Internet Engineering Task Force Trust.

(Continued)

*Primary Examiner* — Ahmed Elallam
(74) *Attorney, Agent, or Firm* — Parker Ibrahim & Berg LLP; James M. Behmke; Kenneth J. Heywood

(57) ABSTRACT

In one embodiment, a device in a network assigns two multi-protocol label switching (MPLS) labels to a single flexible cross-connection maintained by the device for a plurality of endpoint. The device establishes an Ethernet virtual private network (EVPN) backup path to a peer router for the flexible cross-connection in part by exchanging the MPLS labels with the peer router. The device detects a communication failure that resulted from attempting to send a packet between a first one of the endpoints and a second one of the endpoints using local switching on the device and via the flexible cross-connection. The device sends the packet towards the second endpoint using the EVPN backup path to the peer router, after detecting the communication failure and without first using Border Gateway Protocol (BGP) signaling to signal the communication failure to the peer router.

20 Claims, 9 Drawing Sheets

(51) Int. Cl.
*H04L 12/931* (2013.01)
*H04L 12/28* (2006.01)
*H04L 12/18* (2006.01)
*H04L 12/26* (2006.01)
*H04L 12/24* (2006.01)
*H04L 12/761* (2013.01)
*H04L 12/707* (2013.01)
*H04L 12/721* (2013.01)

(56) References Cited

U.S. PATENT DOCUMENTS

| | | | | |
|---|---|---|---|---|
| 9,049,133 | B2* | 6/2015 | Boutros | H04L 45/14 |
| 9,225,664 | B2* | 12/2015 | Dutta | H04L 49/10 |
| 9,397,931 | B1* | 7/2016 | Mohanty | H04L 45/28 |
| 9,628,409 | B1* | 4/2017 | Yuvaraj | H04L 49/201 |
| 9,781,032 | B1* | 10/2017 | Shukla | H04L 45/50 |
| 9,787,573 | B2* | 10/2017 | Singh | H04L 41/00 |
| 10,003,531 | B2* | 6/2018 | Zhou | H04L 12/4633 |
| 10,027,589 | B1* | 7/2018 | Singh | H04L 47/125 |
| 2015/0003458 | A1* | 1/2015 | Li | H04L 45/507 |
| | | | | 370/392 |
| 2017/0063600 | A1* | 3/2017 | Singh | H04L 12/18 |
| 2017/0093611 | A1* | 3/2017 | Arora | H04L 41/0654 |
| 2017/0288948 | A1* | 10/2017 | Singh | H04L 41/0659 |
| 2018/0091445 | A1* | 3/2018 | Singh | H04L 49/351 |
| 2018/0109400 | A1* | 4/2018 | Brissette | H04L 12/4633 |

OTHER PUBLICATIONS

Sajassi et al., "EVPN VPWS Flexible Cross-Connect Service" Internet Draft: draft-sajassi-bess-evpn-vpws-fxc-00.txt; Jul. 2016, 12 pages, The Internet Engineering Task Force Trust.

Boutros et al. "Virtual Private Wire Service Support in Ethernet VPN" Internet Engineering Task Force (IETF); Aug. 2017; pp. 1-17.

* cited by examiner

US 10,212,075 B1

CONVERGENCE OPTIMIZATION OF LOCAL SWITCHING FOR FLEXIBLE CROSS-CONNECT IN ETHERNET VIRTUAL PRIVATE NETWORK (EVPN) ENVIRONMENTS

TECHNICAL FIELD

The present disclosure relates generally to computer networks, and, more particularly, to convergence optimization of local switching for flexible cross-connect service.

BACKGROUND

One growing area of interest in the field of computer networking is Ethernet virtual private network (EVPN) technology. In general, an EVPN instance includes any number of customer edge devices (CEs), such as hosts, routers, switches, etc., and any number of provider edge devices (PEs) that are part of a Multiprotocol Label Switching (MPLS) infrastructure. During operation, the EVPN PEs provide virtualized, bridged Layer 2 connectivity between the CEs. Multiple EVPN instances can also be instantiated in a provider network, as well.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
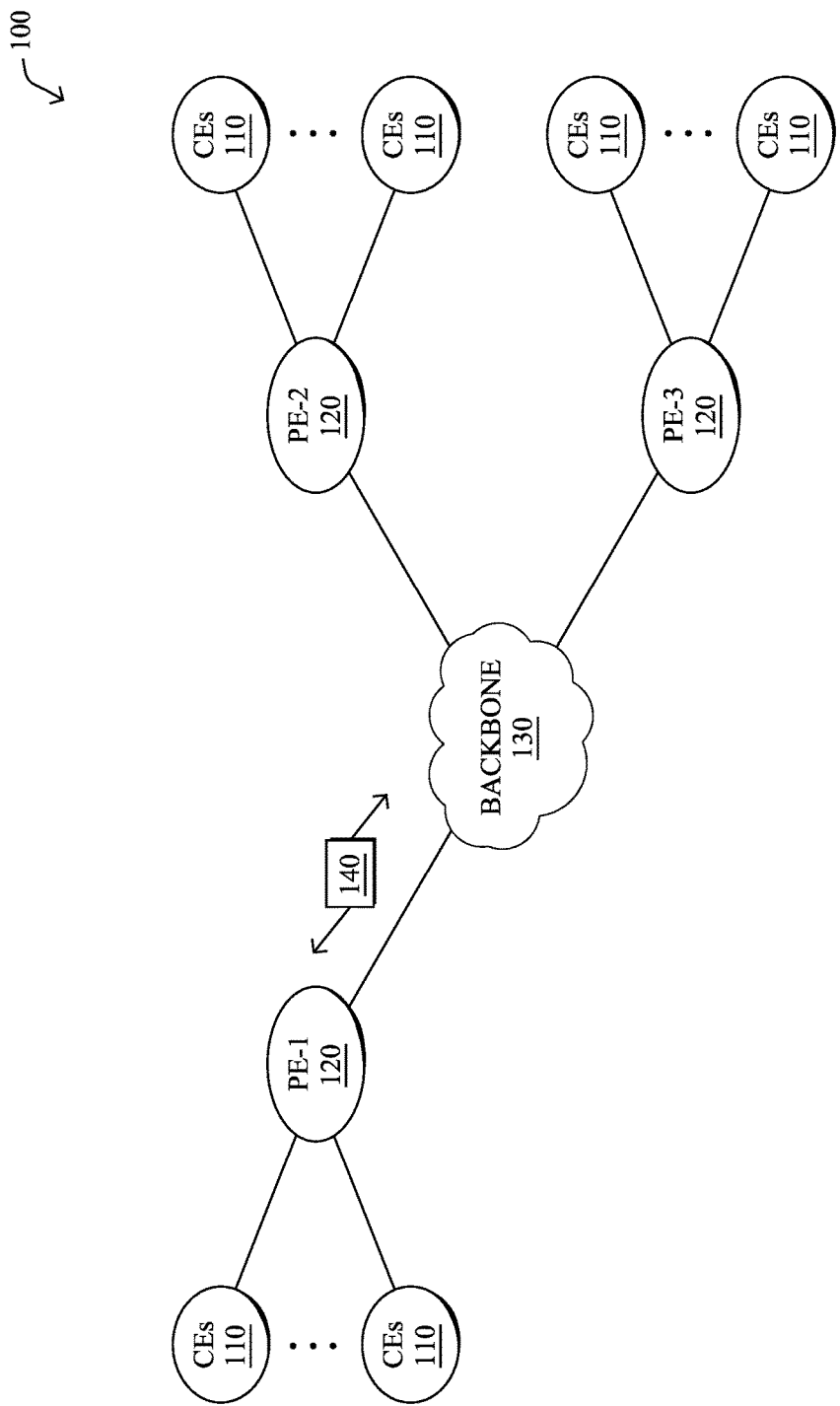
FIGS. 1A-1B illustrate an example communication network.

According to one or more embodiments of the disclosure, a device in a network assigns two multi-protocol label switching (MPLS) labels to a single flexible cross-connection maintained by the device for a plurality of endpoint. The device establishes an Ethernet virtual private network (EVPN) backup path to a peer router for the flexible cross-connection in part by exchanging the MPLS labels with the peer router. The device detects a communication failure that resulted from attempting to send a packet between a first one of the endpoints and a second one of the endpoints using local switching on the device and via the flexible cross-connection. The device sends the packet towards the second endpoint using the EVPN backup path to the peer router, after detecting the communication failure and without first using Border Gateway Protocol (BGP) signaling to signal the communication failure to the peer router

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
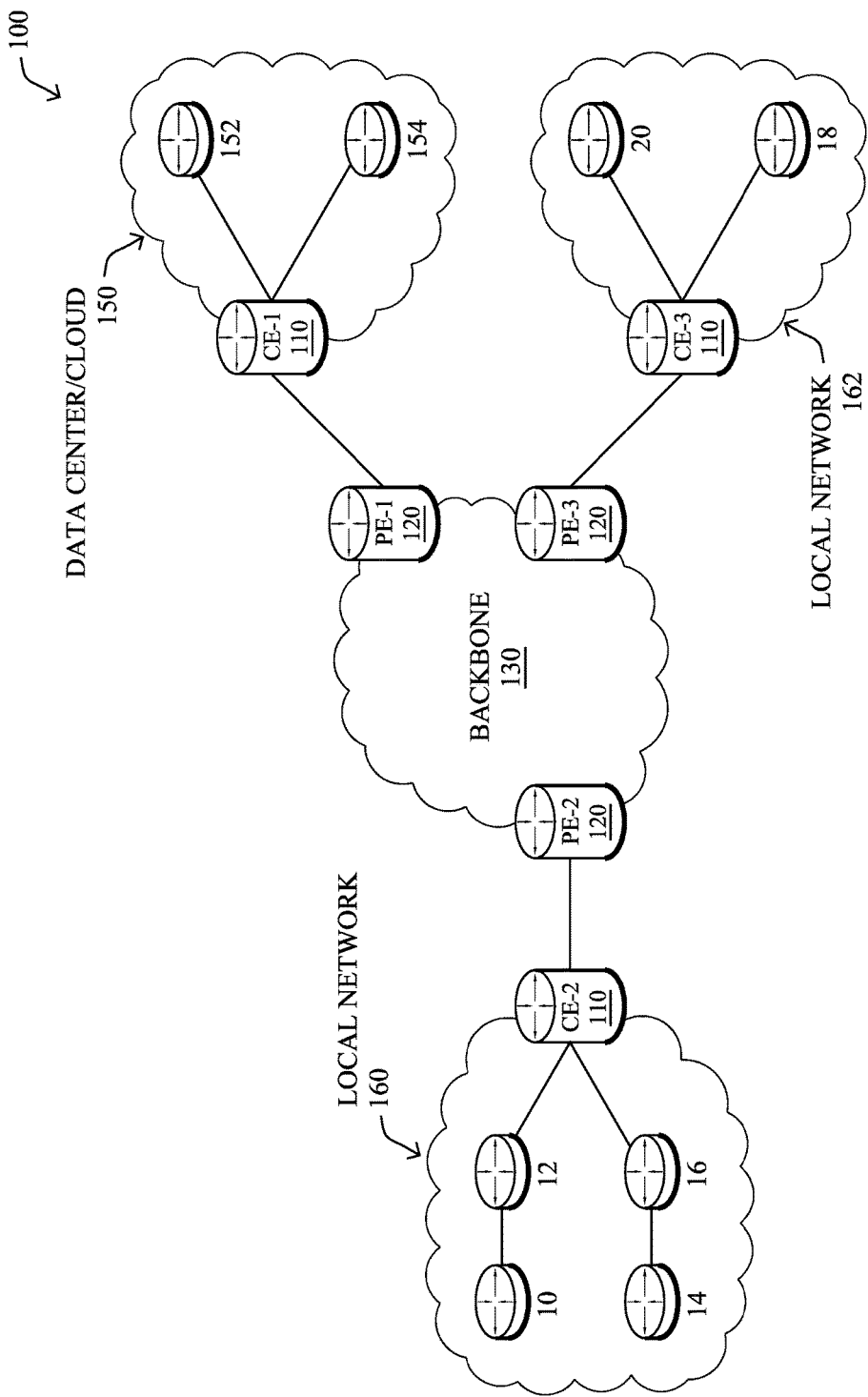

FIG. 1B illustrates an example of network 100 in greater detail, according to various embodiments. As shown, network backbone 130 may provide connectivity between devices located in different geographical areas and/or different types of local networks. For example, network 100 may comprise local/branch network 160 that include devices/nodes 10-16, respectively, as well as data center/cloud environments 150, 162 that includes servers 152-154 and servers 18-20, respectively. Notably, local network 160 and data center/cloud environments 150, 162 may be located in different geographic locations. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

Figure 2:
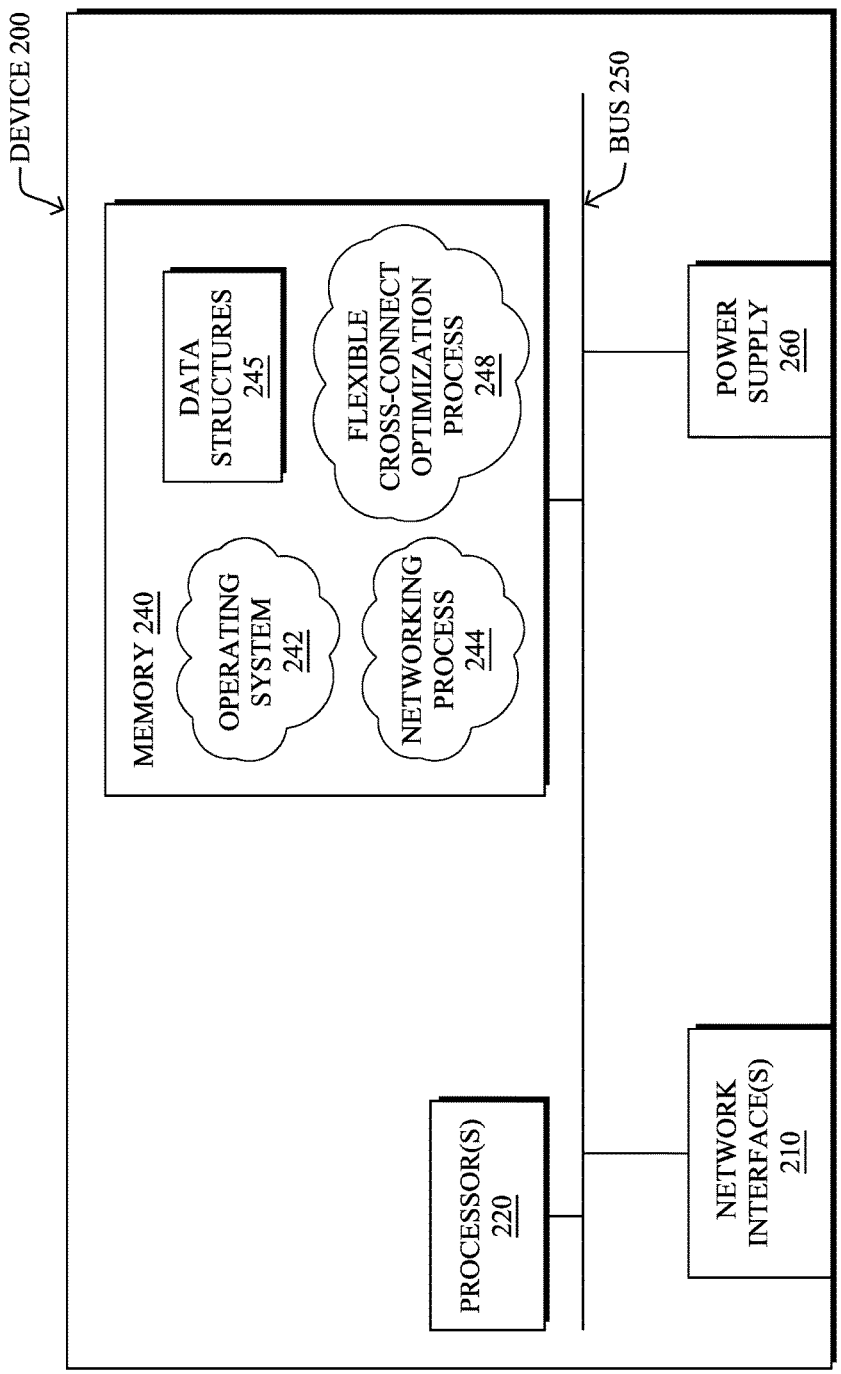
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-16, servers 18-20, 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise networking process 244 and illustratively, a flexible cross-connect optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Networking process/services 244 may include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, networking process 244 may also perform functions related to virtual routing protocols, such as maintaining virtual routing and forwarding (VRF) instances, and/or tunneling protocols, such as for MPLS, generalized MPLS (GMPLS), etc., each as will be understood by those skilled in the art. Also, in certain various embodiments, networking process 244 may be operable to perform Ethernet VPN (EVPN) functions, as described in the IETF Request for Comments (RFC) 7432 entitled "BGP MPLS Based Ethernet VPN" by Sajassi et al. Generally, EVPN offers a solution for multipoint L2VPN services, with advanced multi-homing capabilities, using BGP for distributing customer/client media access control (MAC) address reach-ability information over the core MPLS/IP network.

IETF RFC 8214 entitled "Virtual Private Wire Service Support in Ethernet VPN" by Boutros et al. describes a way to deliver point to point (P2P) services using BGP between a pair of attachment circuits (ACs), with an AC being designated on a port of a PE, virtual LAN (VLAN), or a group of VLANs. To deliver these virtual private wire service (VPWS) functions, two modes of multi-homing operations are possible: single-active and all-active redundancy modes. Generally, in single-active redundancy mode, a single PE among the set of PEs attached to an Ethernet segment is designated to forward traffic to, and from, that segment for a given VLAN. In all-active redundancy mode, all PEs attached to the Ethernet segment are able to forward unicast traffic to, and from, the segment for a given VLAN. Convergence is achieved through the use of a "mass withdraw" messaging mechanism in the control plane and fast protection switching is achieved through the use of prefix-independent convergence in the data plane when there is a link or node failure. In addition, if the VPWS service is to span across a plurality of autonomous systems, BGP in the EVPN environment eliminates the need for multi-segment pseudowire signaling and discovery.

A service provider may operate up to millions of ACs that require tag manipulation (e.g., via VLAN translation) for backhauling across its MPLS/IP network. To reduce the number of EVPN service labels for the VPWS service tunnels, a large number of ACs may be multiplexed across several physical interfaces (e.g., Ethernet segments) onto a single VPWS tunnel. Doing so reduces the number of EVPN service labels associated with the tunnels, as well as the EVPN BGP signaling. Accordingly, the IETF draft entitled "EVPN VPWS Flexible Cross-Connect Service"<draft-sajassi-bess-evpn-vpws-fxc-01.txt> by Sajassi et al., presents techniques to achieve these goals, which networking process 244 may implement, in various embodiments.

More specifically, the "EVPN VPWS Flexible Cross-Connect Service" IETF draft introduces two mechanisms to multiplex a plurality of ACs onto a single VPWS tunnel, the first mechanism supporting VPWS services between two single-homed endpoints and the second mechanism supporting VPWS services between multi-homed endpoints. Note that an endpoint in this context may be an AC, MAC-VRF, IP-VRF, global table, or the like.

Figure 3A:
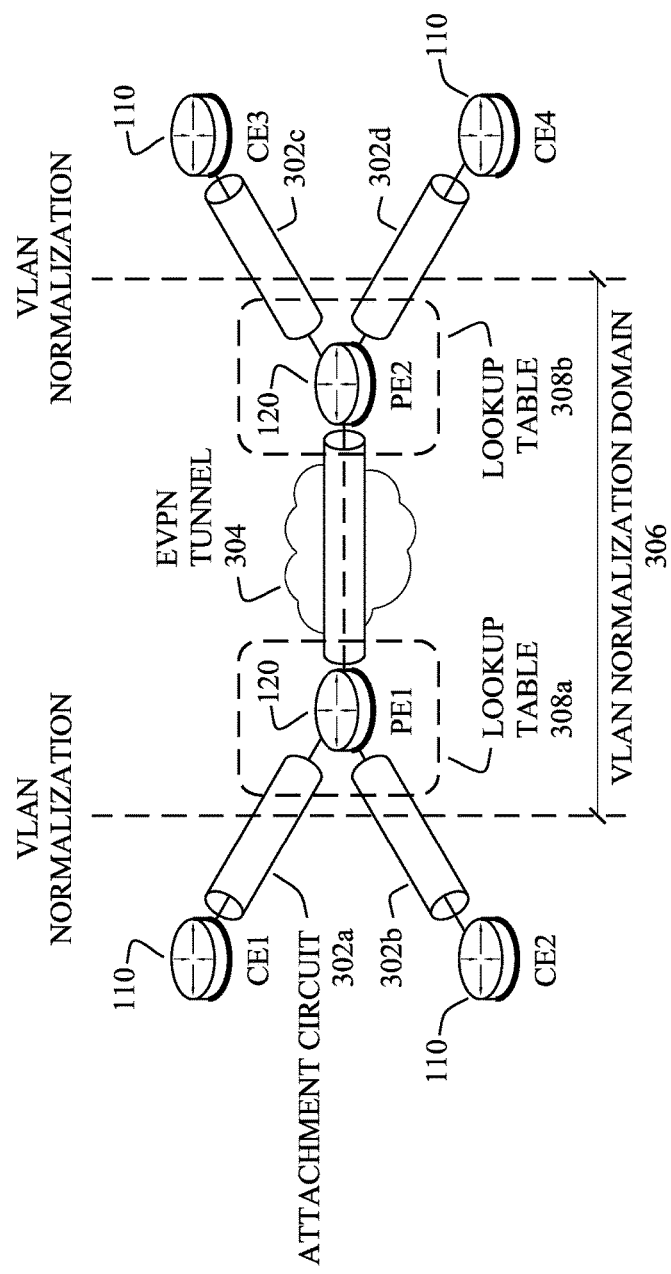
FIGS. 3A-3B illustrate examples of flexible cross-connects in Ethernet virtual private network (EVPN) environments.

FIG. 3A illustrates an example 300 of the first flexible cross-connect service mechanism in operation for single-homed endpoints (e.g., within network 100), in some embodiments. As shown, assume that a set of CE routers 110, CE1 and CE2, are single-homed to a PE router 120, PE2, each connection of which forming attachment circuits (ACs) 302a and 302b, respectively. Similarly, CE 3 and CE 4 may be single-homed to PE2, thereby forming ACs 302c and 302d. During formation, PE1 and PE2 may exchange routes using BGP and establish a single EVPN tunnel 304 to which the ACs 302 are multiplexed by their respective PEs 120.

Since tunnel 304 is used to multiplex multiple ACs 302 across different Ethernet segments (e.g., physical segments), the EVPN label is not enough to forward a packet to its proper egress interface. Thus, a VLAN normalization domain 306 may be formed between PE1 and PE2, whereby ACs 302 are represented either by a single VLAN tag or double VLAN tags, and the AC 302 associated with the same VLAN tag(s) are then cross-connected on the opposing PE router 120. More specifically, VLAN rewrites in lookup table 308a on PE1 must match the rewrites configured in table 308b on PE2, and vice-versa. The rewrite tag can then be used to forward the traffic to the proper AC 302. For example, if the same rewrite tag is configured for both CE1 and CE3, the traffic will be sent from CE1 to CE3 via EVPN tunnel 304.

Figure 3B:
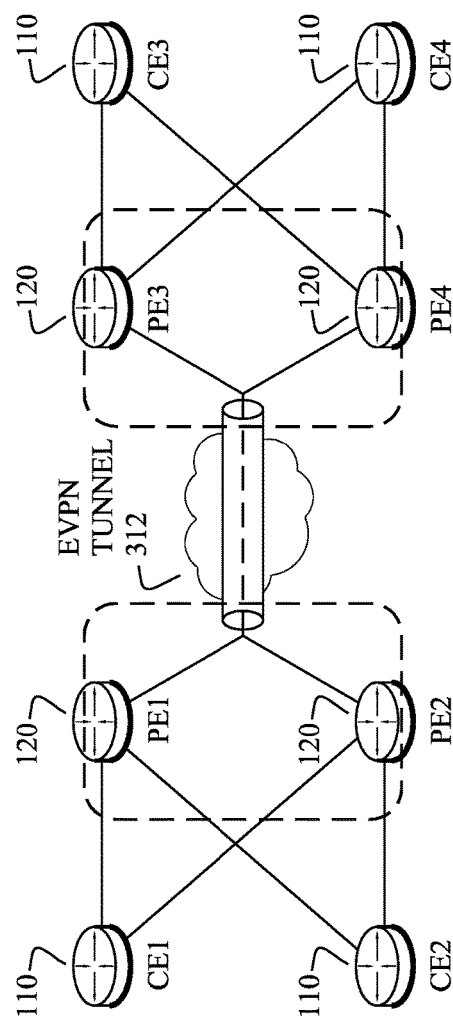

FIG. 3B illustrates an example 310 of the second flexible cross-connect mechanism that can be implemented in network 100, according to various embodiments. In particular, example 310 illustrates an alternate case whereby CE routers 110, CE1 and CE2, are multi-homed to PE routers 120, PE1 and PE2. Similarly, CE routers 110, CE3 and CE4 may be multi-homed to PE routers 120, PE3 and PE4. The PEs 120 shown may exchange Ethernet segment route information to their corresponding peering PEs and advertised for each main interface. Similar to the single-homed example 300, the PEs 120 on each end may multiplex the traffic through an EVPN tunnel 312. Load balancing is also used to select the destination PE, on a per-flow basis.

Flexible cross-connect services can also be "VLAN unaware" or "VLAN aware." In the VLAN unaware case, a single VPWS service ID can be used to represent the EVPN tunnel, VLAN failure is not signaled (e.g., via BGP), and a separate EVPN instance (EVI)/EAD is advertised per flexible cross-connection (e.g., as opposed to for each AC). In the VLAN aware case, however, ACs are normalized across different Ethernet segments and multiplexed using a single EVPN VPWS tunnel that is represented by many VPWS service IDs. BGP is used to signal these normalized VIDs and to signal VLAN failure. Also in the VLAN aware case, a per EVI/EAD route is advertised per AC. Furthermore, each VLAN-aware FXC has an unique EVPN instance.

Local switching is also supported in the VLAN-aware case, whereby a given PE can locally switch traffic between ACs of the PE and belonging to different Ethernet segments that have the same normalized VLANs. For example, assume that a pseudowire connects PE1 and PE2 in example 310 of FIG. 3B and that CE1 and CE2 have different Ethernet segments, but the same normalized VLANs. In such a case, if CE1 is to send traffic CE2, PE1 may route the traffic directly to CE2 using local switching. If a failure occurs in the link between PE1 and CE2, PE1 can then send the traffic to PE2 via the EVPN, allowing PE2 to send the traffic on to CE2.

As proposed in the "EVPN VPWS Flexible Cross-Connect Service" IETF draft, the flexible cross-connect, VLAN-aware mechanism uses the same MPLS label on a given all-active Ethernet segment, to reduce the number of MPLS labels. This is because some devices are limited by hardware in terms of the number of labels that they can use. However, in the specific case whereby local switching is performed under flexible cross-connect, VLAN-aware, all-active multi-homing, a separate MPLS label is utilized for each VLAN that is to be locally switched. Doing so goes against the fundamental premise of VLAN-aware, flexible cross-connect using a single MPLS label for all VLANs of an Ethernet segment.

Convergence Optimization of Local Switching for Flexible Cross-Connect in EVPN Environments The techniques herein provide for a VLAN-aware flexible-cross connect mechanism that uses only two MPLS labels, which also providing redundancy with very fast convergence for all-active, dual-homing, which is independent from BGP route advertisements. In other words, the techniques herein introduce a new flexible cross-connect mechanism that supports all-active, multi-homing and local switching between multiple access devices/access networks, using a minimal number of EVPN label and exhibits an optimal convergence time upon service failure.

Specifically, according to one or more embodiments of the disclosure as described in detail below, a device in a network assigns two multi-protocol label switching (MPLS) labels to a single flexible cross-connection maintained by the device for a plurality of endpoint. The device establishes an Ethernet virtual private network (EVPN) backup path to a peer router for the flexible cross-connection in part by exchanging the MPLS labels with the peer router. The device detects a communication failure that resulted from attempting to send a packet between a first one of the endpoints and a second one of the endpoints using local switching on the device and via the flexible cross-connection. The device sends the packet towards the second endpoint using the EVPN backup path to the peer router, after detecting the communication failure and without first using Border Gateway Protocol (BGP) signaling to signal the communication failure to the peer router.

Illustratively, the techniques described herein may be performed by hardware, software, and/or firmware, such as in accordance with the flexible cross-connect optimization process 248, which may include computer executable instructions executed by the processor 220 (or independent processor of interfaces 210) to perform functions relating to the techniques described herein, e.g., in conjunction with networking process 244.

Operationally, the techniques herein introduce an optimized mechanism for local switching via flexible cross-connect in EVPN environments that uses only two MPLS labels per flexible cross-connect, significantly reducing the number of labels needed. An example of the techniques herein is illustrated in FIGS. 4A-4C.

Figure 4A:
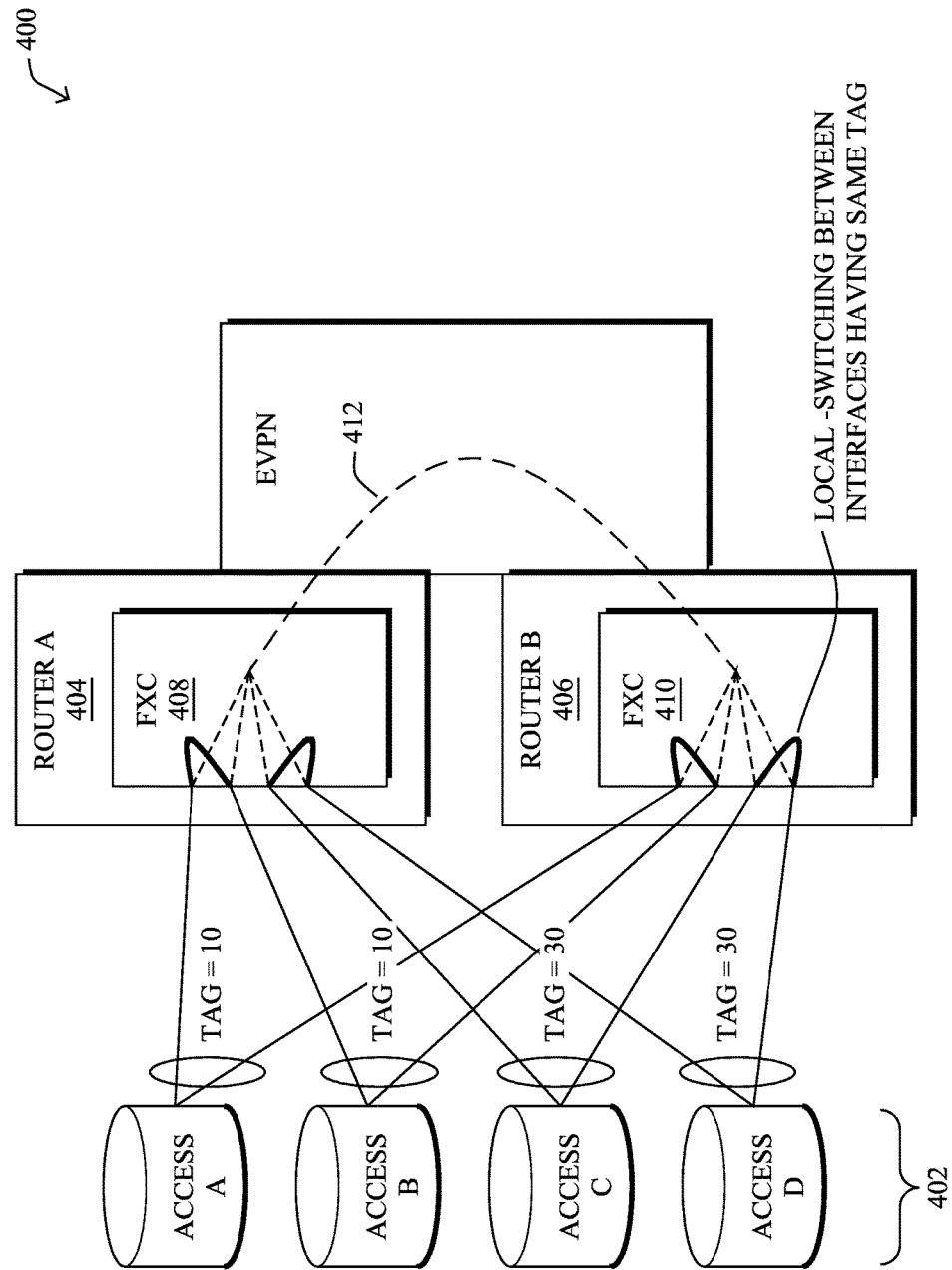
FIGS. 4A-4C illustrate examples of optimized local switching for a cross-connect in an EVPN environment.
Figure 4B:
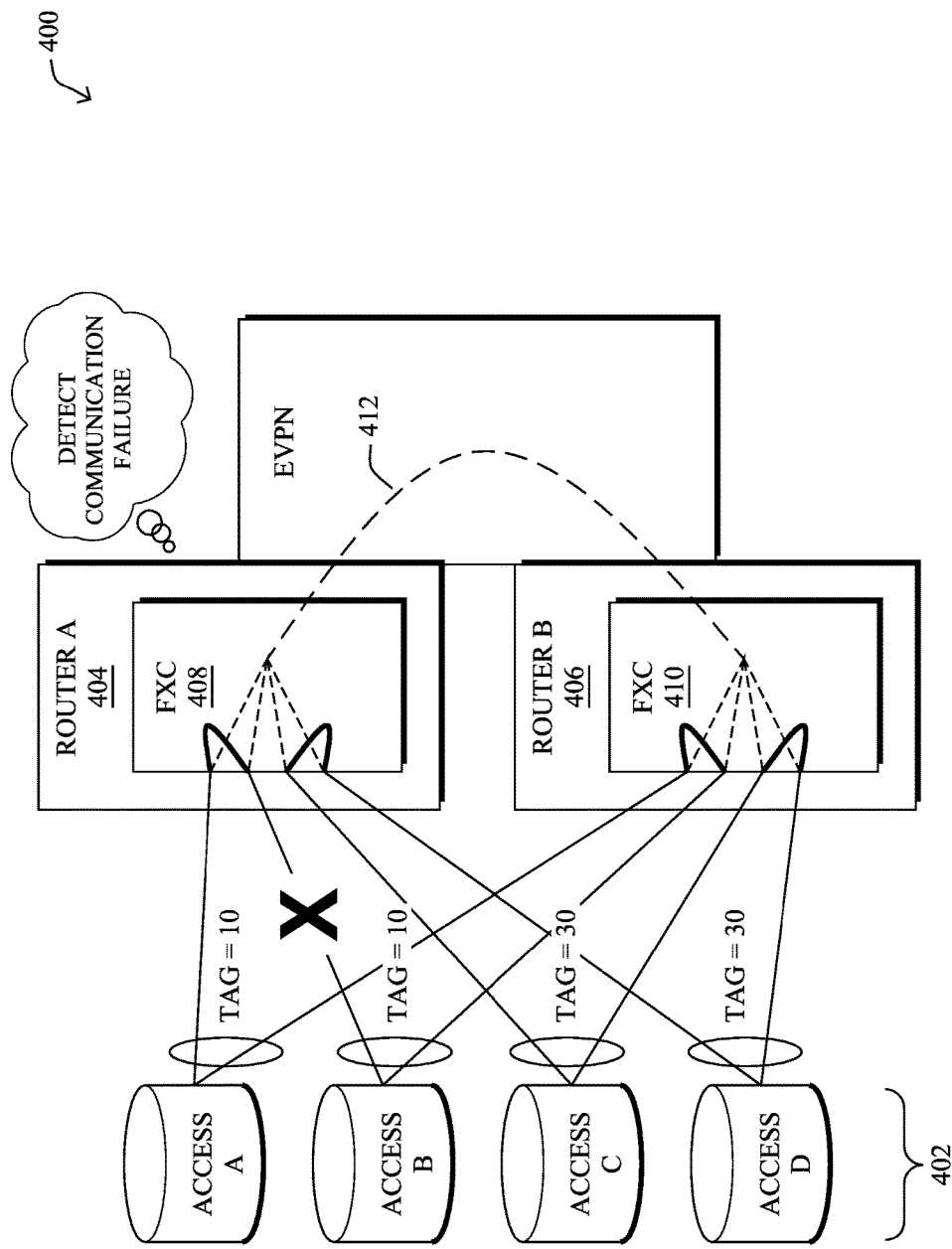
Figure 4C:
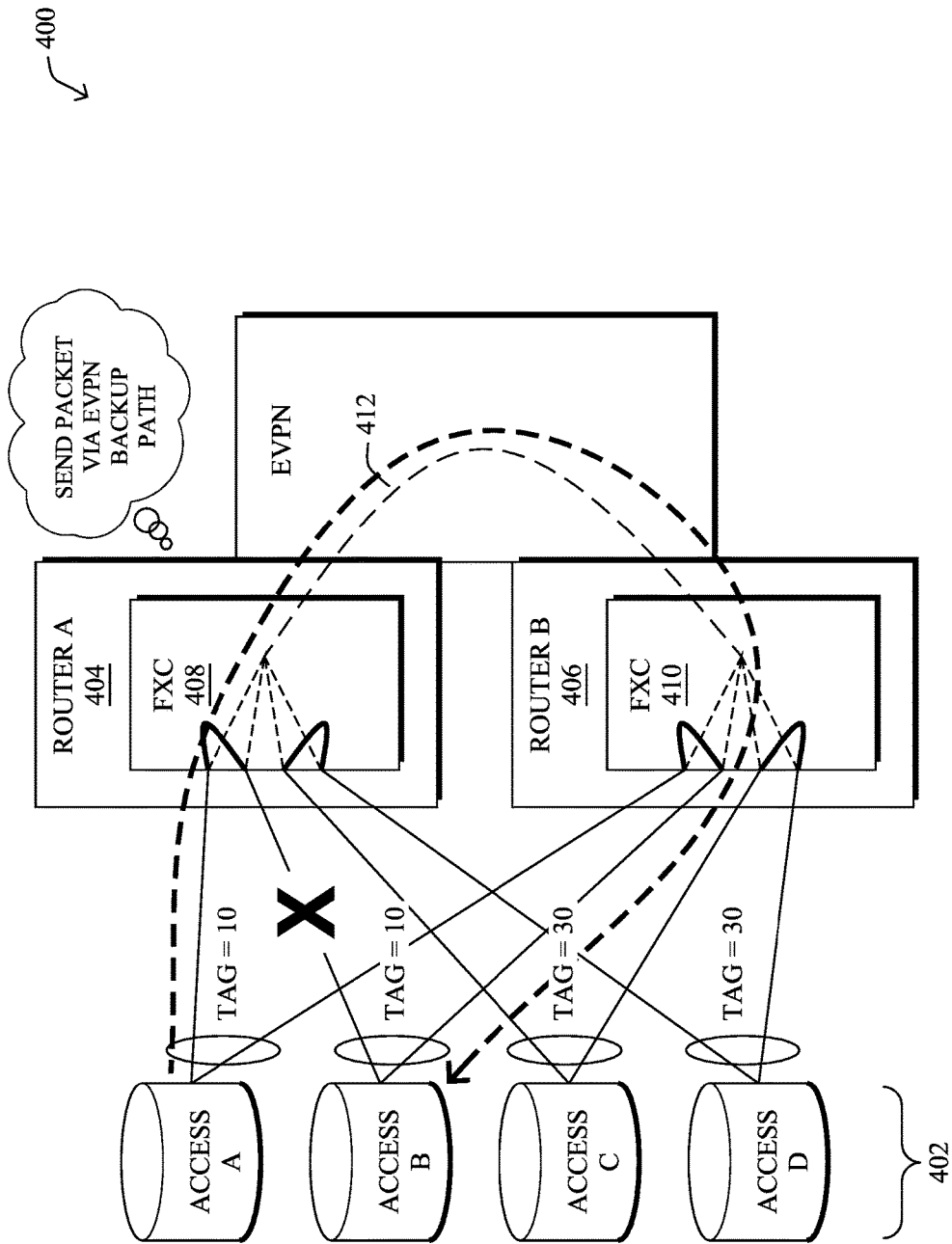

As shown in FIG. 4A, assume that EVPN environment 400 includes two routers: Router A (404) and Router B (406). Such routers may be, for example, PE routers of the same provider network, in some embodiments. Note however, that the example shown is but one possible configuration in which the techniques herein can be implemented and that other configurations are also possible, in further embodiments. For example, in further embodiments, multiple interfaces could go through a given flexible cross-connect, as well.

Connected to routers A and B may be a plurality of endpoints 402 that, in some embodiments, multi-homed to routers A and B. For example, endpoints 402 may include accesses A, B, C, and D that are each multi-homed to both of routers A and B as part of an all-active configuration. Each of routers A and B may also maintain separate flexible cross-connects 408 and 410, respectively, that serve to multiplex the traffic associated with the endpoints 402.

Also as shown, flexible cross-connects 408-410 may be configured to provide local switching to the traffic associated with endpoints 402. More specifically, local switching can be performed between interfaces having the same tag. For example, since Access A and Access B are both connected to flexible cross-connect 408, traffic sent from Access A to Access B, or vice-versa, may be performed locally by Router A via cross connect 408.

To provide backup capabilities, routers A and B may also form an EVPN backup path 412. Thus, when a communication failure occurs, EVPN backup path 412 can be leveraged by the initial router to send a packet to its destination in endpoints 402 via the other router During setup, routers A and B may assign two labels for each of their respective cross-connects, according to various embodiments. For example, Router A may assign labels as follows and store them in its lookup table as follows:

TABLE 1

Router A after label assignment

| Ethernet-Tag | Local Label | Remote Label (backup path) |
|---|---|---|
| (access-a)10 | 16010 | N/A |
| (access-b)10 | 16011 | N/A |
| (access-c)30 | 16010 | N/A |
| (access-d)30 | 16011 | N/A |

Router B may also perform a similar operation with respect to its own flexible cross-connection 410, resulting in the following label assignments in the lookup table of router B:

TABLE 2

Router B after label assignment

| Ethernet-Tag | Local Label | Remote Label (backup path) |
|---|---|---|
| (access-a)10 | 16200 | N/A |
| (access-b)10 | 16220 | N/A |
| (access-c)30 | 16200 | N/A |
| (access-d)30 | 16220 | N/A |

In various embodiments, the two labels may be used as follows:

Locally switched services must use different labels

Non-locally switched services can use any of the two labels

To provide a backup route in case of failure, routers A and B may exchange their respective labels per EVI/EAD RT-1. On RT-1 reception, routers A and B can program EVPN backup path 412. Accordingly, routers A and B may update their lookup tables as follows:

TABLE 3

Router A after programming backup path

| Ethernet-Tag | Local Label | Remote Label (backup path) |
|---|---|---|
| (access-a)10 | 16010 | 16220 |
| (access-b)10 | 16011 | 16200 |
| (access-c)30 | 16010 | 16220 |
| (access-d)30 | 16011 | 16200 |

TABLE 4

Router B after programming backup path

| Ethernet-Tag | Local Label | Remote Label (backup path) |
|---|---|---|
| (access-a)10 | 16200 | 16011 |
| (access-b)10 | 16220 | 16010 |
| (access-c)30 | 16200 | 16011 |
| (access-d)30 | 16220 | 16010 |

FIG. 4B illustrates an example of a communication failure occurring within environment 400, according to various embodiments. Assume that Access A sends a packet to Router A that is destined for Access B. In turn, Router A may use flexible cross-connect 408 to locally switch the packet and send the packet on towards Access B. However, assume that Router A detects a communication failure when sending the packet to Access B.

In FIG. 4C, after detecting the communication failure to Access B, Router A may use its lookup table to identify the corresponding remote label for Access B. In turn, Router A may send the packet to Router B with the following VPN label:

TABLE 5

VPN label for packet sent via EVPN backup path

| EVPN Label | 16220 |
|---|---|
| MAC Destination Address (DA) | MAC DA |
| MAC Source Address (SA) | MAC SA |
| VLAN Identifier (VID) Tag | 10 |

Router A then forwards the packet with the above label to Router B via EVPN backup path 412. Notably, Router A may also append an LSP label to the packet, to deliver the packet to Router B. In turn, Router B forwards the packet on to the destination, Access B, based on the above VPN label added to the packet by router A. More specifically, Router B may perform a lookup of EVPN label 16220 and VID 10 indicated in the above label of the packet, to determine that the packet is destined for Access B and forward the packet on to Access B, accordingly. Said differently, Router B may use the EVPN label to identify the right FXC and a potential backup path and use the VID tag to forward the packet on the proper backup path. Thus, even though Router A is unable to reach Access B, the packet can still be delivered to Access B via Router B.

In contrast to other flexible cross-connect mechanisms, Router A does not need to first use BGP signaling to signal the communication failure with Access B to Router B. Instead, Router A is immediately able to make the decision locally to send the packet via EVPN backup path 412 using the label information in its lookup table that was previously received as part of the label exchange with Router B. In addition, rather than the VIDs having per-port significance, the VIDs using the techniques herein instead have global significance within the flexible cross-connect.

Figure 5:
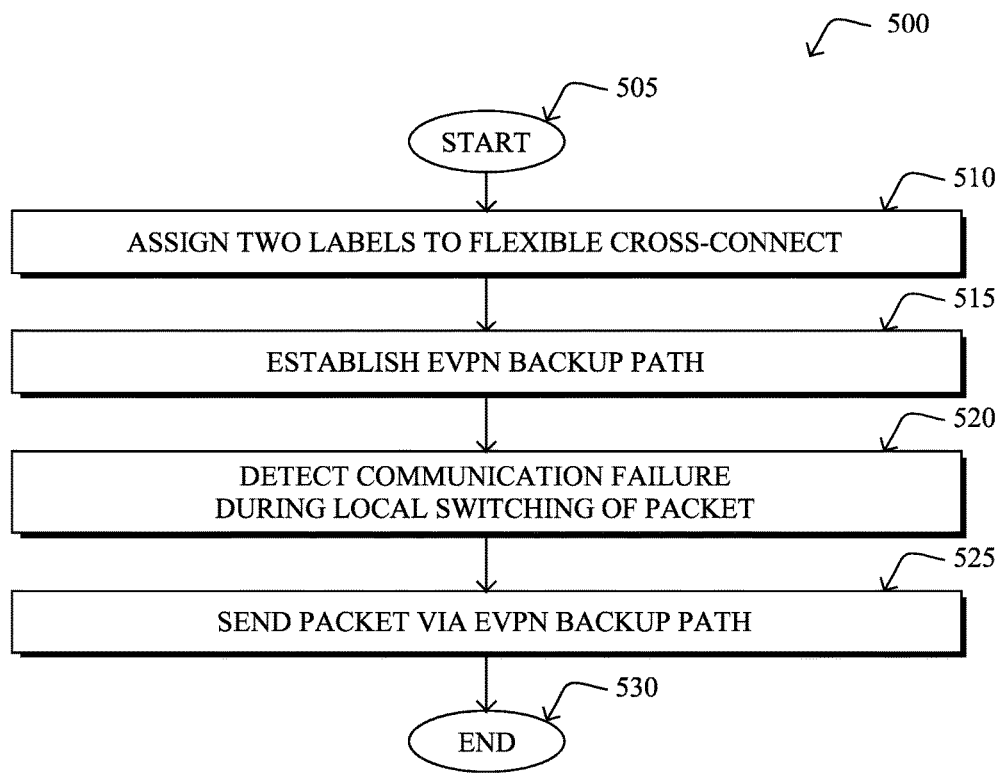
FIG. 5 illustrates an example simplified procedure for optimized local switching for a cross-connect in an EVPN environment.

FIG. 5 illustrates an example simplified procedure for optimized local switching for a cross-connect in an EVPN environment, in accordance with one or more embodiments described herein. For example, a non-generic, specifically configured device (e.g., device 200) may perform procedure 500 by executing stored instructions (e.g., processes 244, 248). In some embodiments, the device may be a PE router in communication with any number of endpoints (e.g., other routers, ACs, etc.) and/or other peer routers in the network.

Procedure 500 may start at step 505, and continues to step 510, where, as described in greater detail above, the device may assign two multi-protocol label switching (MPLS) labels to a single flexible cross-connection maintained by the device for the plurality of endpoint. In some cases, the endpoints may be multi-homed to both the device and the peer router.

At step 515, as detailed above, the device may establish an EVPN backup path with the peer router. In various embodiments, this may entail the device exchanging the assigned labels with the peer router. For example, the device may send information to the peer router regarding one of the endpoints indicative of a given VID and local label assigned to the endpoint. The device may also, as part of this exchange, receive the corresponding VID and label information from the peer router.

At step 520, the device may detect a communication failure that resulted from attempting to locally switch a packet between a first one of the endpoints (e.g., the packet source) and a second one of the endpoints (e.g., the destination) via its flexible cross-connection, as described in greater detail above. Notably, the device may first attempt to locally switch the packet using its flexible cross-connection based on its generated labels, which it may store in a local lookup table of the device.

At step 525, as detailed above, the device may send the packet towards the second endpoint using the EVPN backup path to the peer router, after detecting the communication failure. In various embodiments, the device may do so by performing a lookup of the corresponding label information for the second endpoint that the device received during the label exchange with the peer router when establishing the EVPN backup path. Using the retrieved information, the device may append a VPN label to the packet that includes the EVPN label assigned to the second endpoint by the peer router, the source and destination MAC addresses, and/or the VID. Doing so allows the peer router to use this information to send the packet on to the second endpoint via its own cross-connect. In various embodiments, this may be performed without first having to use BGP signaling to notify the peer router of the failure. Instead, the device can make the decision to use the backup path locally and send the packet on to the peer router. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for local switching in an EVPN environment through a flexible cross-connect that requires only two labels per cross-connect. In addition, and in contrast to existing local switching mechanisms, the techniques herein allow for extremely fast convergence on local failure, since the switchover processing only happens locally. Thus, BGP route advertisement is not needed with the techniques herein, since the disposition path is already pre-programmed on the peer router.

While there have been shown and described illustrative embodiments that provide for convergence optimization of local switching for flexible cross-connects, it is to be understood that various other adaptations and modifications may be made within the spirit and scope of the embodiments herein. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/ RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   assigning, by a device in a network, two multi-protocol label switching (MPLS) labels to a single flexible cross-connection maintained by the device for a plurality of endpoint;
   establishing, by the device, an Ethernet virtual private network (EVPN) backup path to a peer router for the flexible cross-connection in part by exchanging the MPLS labels with the peer router;
   detecting, by the device, a communication failure that resulted from attempting to send a packet between a first one of the endpoints and a second one of the endpoints using local switching on the device and via the flexible cross-connection; and
   sending, by the device, the packet towards the second endpoint using the EVPN backup path to the peer router, after detecting the communication failure and without first using Border Gateway Protocol (BGP) signaling to signal the communication failure to the peer router.

2. The method as in claim 1, further comprising:
   using, by the device, the two labels to locally switch traffic between the plurality of endpoints.

3. The method as in claim 1, wherein establishing the EVPN backup path comprises receiving a backup label from the peer router associated with the second endpoint, and wherein sending the packet towards the second endpoint using the EVPN backup path to the peer router comprises performing a lookup of the backup label.

4. The method as in claim 1, wherein the peer router uses the exchanged labels to send the packet to the second endpoint.

5. The method as in claim 1, wherein sending the packet towards the second endpoint using the EVPN backup path comprises:
   adding, by the device, a label to the packet that includes an EVPN label, a destination media access control (MAC) address, a source MAC address, and a virtual local area network (VLAN) identifier (VID) tag.

6. The method as in claim 5, wherein the VLAN identifier has global significance within the flexible cross-connection.

7. The method as in claim 1, wherein the plurality of endpoints are multi-homed to the device and to the peer router.

8. An apparatus, comprising:
   one or more network interfaces to communicate via a computer network;
   a processor coupled to the one or more network interfaces and configured to execute one or more processes; and
   a memory configured to store a process executable by the processor, the process when executed configured to:
      assign two multi-protocol label switching (MPLS) labels to a single flexible cross-connection maintained by the apparatus for a plurality of endpoint;
      establish an Ethernet virtual private network (EVPN) backup path to a peer router for the flexible cross-connection in part by exchanging the MPLS labels with the peer router;
      detect a communication failure that resulted from attempting to send a packet between a first one of the endpoints and a second one of the endpoints using local switching on the apparatus and via the flexible cross-connection; and
      send the packet towards the second endpoint using the EVPN backup path to the peer router, after detecting the communication failure and without first using Border Gateway Protocol (BGP) signaling to signal the communication failure to the peer router.

9. The apparatus as in claim 8, wherein the process when executed is further configured to:
   use the two labels to locally switch traffic between the plurality of endpoints.

10. The apparatus as in claim 8, wherein the apparatus establishes the EVPN backup path by receiving a backup label from the peer router associated with the second endpoint, and wherein the apparatus sends the packet towards the second endpoint using the EVPN backup path to the peer router by performing a lookup of the backup label.

11. The apparatus as in claim 8, wherein the peer router uses the exchanged labels to send the packet to the second endpoint.

12. The apparatus as in claim 8, wherein the apparatus sends the packet towards the second endpoint using the EVPN backup path by:
   adding a label to the packet that includes an EVPN label, a destination media access control (MAC) address, a source MAC address, and a virtual local area network (VLAN) identifier (VID) tag.

13. The apparatus as in claim 12, wherein the VLAN identifier has global significance within the flexible cross-connection.

14. The apparatus as in claim 8, wherein the plurality of endpoints are multi-homed to the apparatus and to the peer router.

15. A tangible, non-transitory, computer-readable media having software encoded thereon, the software when executed by a device in a network cause the device to perform a process comprising:
   assigning, by the device, two multi-protocol label switching (MPLS) labels to a single flexible cross-connection maintained by the device for a plurality of endpoint;
   establishing, by the device, an Ethernet virtual private network (EVPN) backup path to a peer router for the flexible cross-connection in part by exchanging the MPLS labels with the peer router;
   detecting, by the device, a communication failure that resulted from attempting to send a packet between a first one of the endpoints and a second one of the endpoints using local switching on the device and via the flexible cross-connection; and
   sending, by the device, the packet towards the second endpoint using the EVPN backup path to the peer router, after detecting the communication failure and without first using Border Gateway Protocol (BGP) signaling to signal the communication failure to the peer router.

16. The computer-readable medium as in claim 15, wherein process further comprises:
    using the two labels to locally switch traffic between the plurality of endpoints.

17. The computer-readable medium as in claim 15, wherein sending the packet towards the second endpoint using the EVPN backup path comprises:
    adding, by the device, a label to the packet that includes an EVPN label, a destination media access control (MAC) address, a source MAC address, and a virtual local area network (VLAN) identifier (VID) tag.

18. The computer-readable medium as in claim 17, wherein the VLAN identifier has global significance within the flexible cross-connection.

19. The computer-readable medium as in claim 15, wherein the plurality of endpoints are multi-homed to the device and to the peer router.

20. The computer-readable medium as in claim 15, wherein the device and the peer router are provider edge (PE) routers.

\* \* \* \* \*